Figure 1:
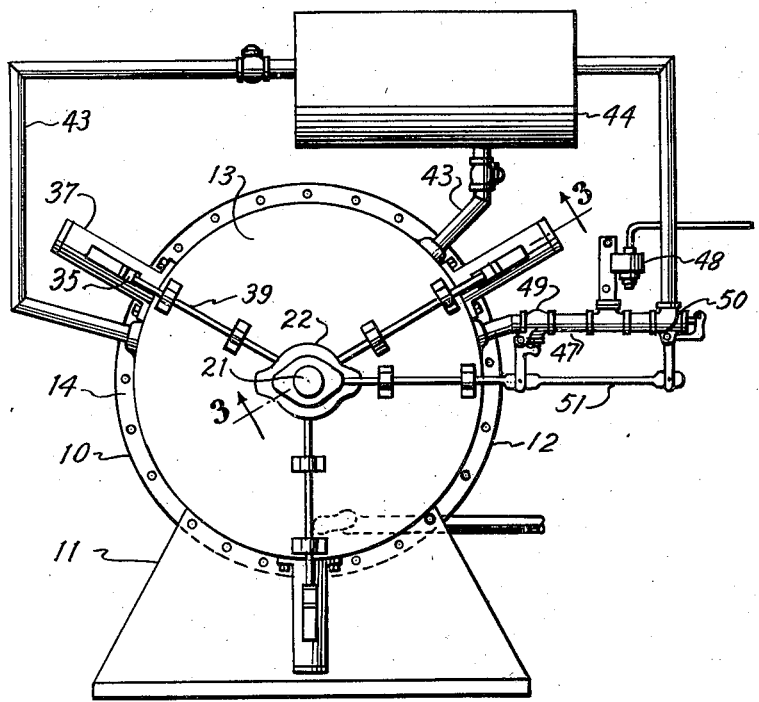

March 19, 1946.  H. D. RICE  2,396,882
ROTARY ENGINE AND MEANS FOR SEALING THE SAME
Filed Jan. 28, 1944  3 Sheets-Sheet 1

Hudson D. Rice
Inventor

By Jack L. Schley
Joseph H. Schley
Attorneys

March 19, 1946.　　　H. D. RICE　　　2,396,882
ROTARY ENGINE AND MEANS FOR SEALING THE SAME
Filed Jan. 28, 1944　　　3 Sheets-Sheet 2

Hudson D. Rice
Inventor

By Jack A. Schley
Joseph H. Schley
Attorneys

March 19, 1946. H. D. RICE 2,396,882
ROTARY ENGINE AND MEANS FOR SEALING THE SAME
Filed Jan. 28, 1944 3 Sheets-Sheet 3
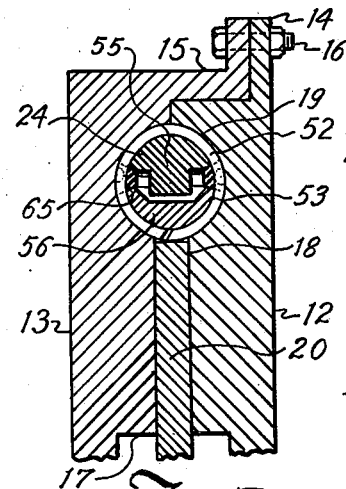
Fig. 7
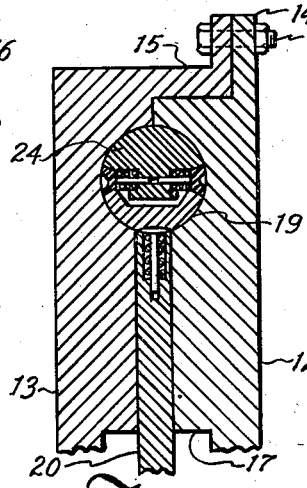
Fig. 8
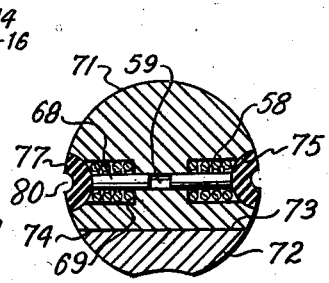
Fig. 13
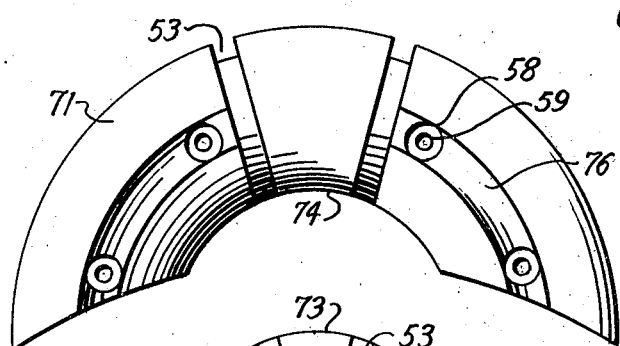
Fig. 12
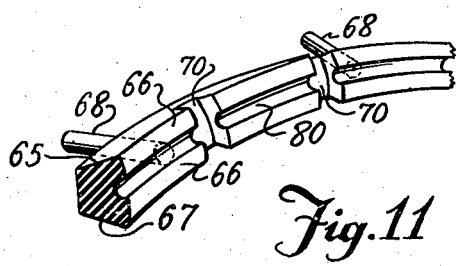
Fig. 11
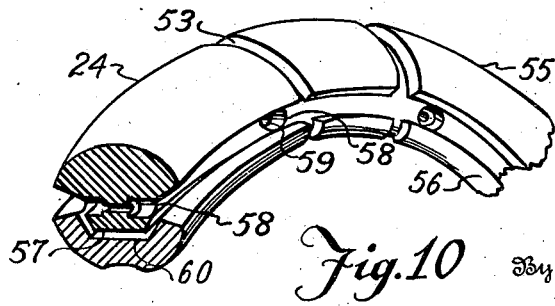
Fig. 10
Hudson D. Rice, Inventor
By Jack L. Schley
Joseph H. Schley
Attorneys Patented Mar. 19, 1946

2,396,882

UNITED STATES PATENT OFFICE 2,396,882

ROTARY ENGINE AND MEANS FOR SEALING THE SAME

Hudson D. Rice, Dallas, Tex.

Application January 28, 1944, Serial No. 520,025

8 Claims. (Cl. 121—76)

This invention relates to new and useful improvements in rotary engines and means for sealing the same.

One object of the invention is to provide an improved engine, of the rotary type, having means for sealing off between the rotor and cylinder of the engine to prevent the escape of gas or air under pressure and thereby provide a more efficiently and economically operating engine.

An important object of the invention is to provide an improved rotary engine having means mounted on its piston for sealing off between the cylinder and said piston, the sealing means preferably extending both longitudinally and circumferentially of the piston to assure a positive sealing action.

Another object of the invention is to provide an improved rotary engine, of the character described, having the sealing means of its piston exposed to the pressure within its cylinder and having pressure means associated with the sealing means for increasing the sealing action thereof and for coacting with said cylinder pressure to maintain the same in sealing engagement.

A particular object of the invention is to provide an improved rotary engine having a split piston with sealing means interposed therebetween for sealing off between the portions of the piston and its cylinder, one portion being urged into engagement with the sealing means by pressure so as to assure a positive seal and to compensate for wear.

A further object of the invention is to provide a rotary engine having an improved piston which preferably includes internal and external portions with a pressure-actuated sealing member interposed therebetween, the internal piston portion being urged into sealing engagement with the sealing member by suitable pressure means, whereby said internal piston portion coacts with said sealing member to efficiently seal off the portions of the piston and between said piston and its cylinder as well as to compensate for wear of the contacting surfaces.

Still another object of the invention is to provide an improved rotary engine, of the character described, having means for sealing off between the rotor and the cylinder as well as between said cylinder and the piston, the sealing means being exposed to the pressure within said cylinder and being spring-pressed, whereby the pressures coact to maintain said sealing means in the desired sealing position.

A construction designed to carry out the invention will be hereinafter described together with other features of the invention.

Figure 2:
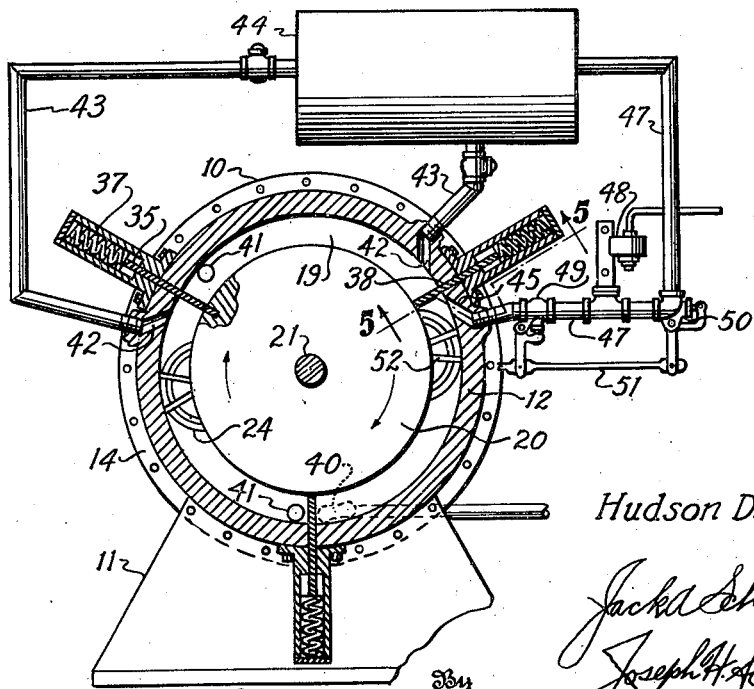
Figures 3, 4, 5:
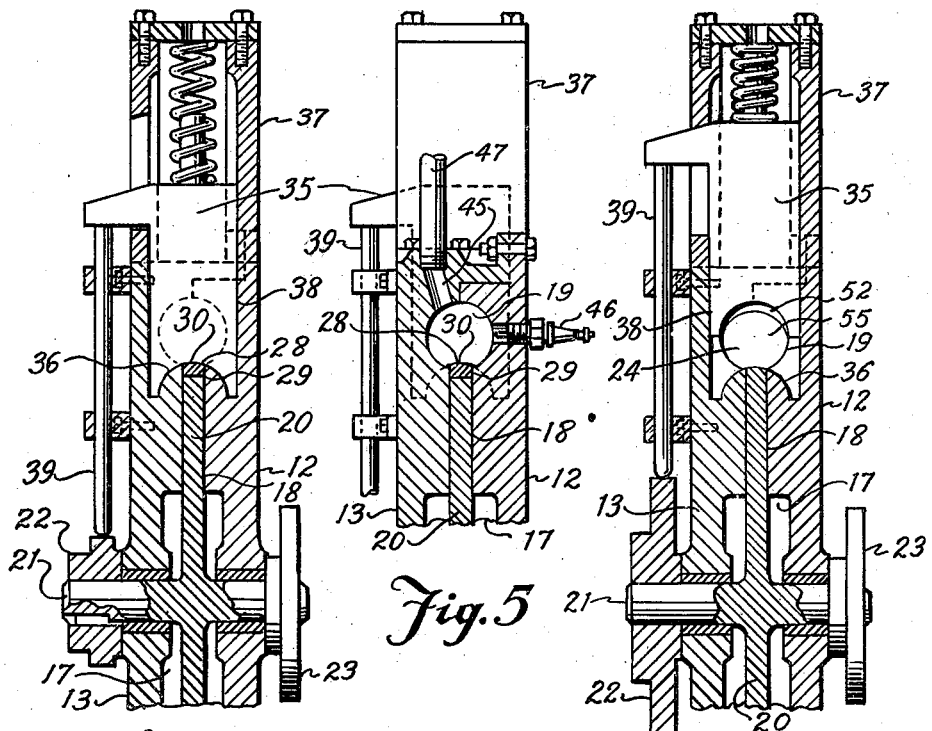
Figure 6:
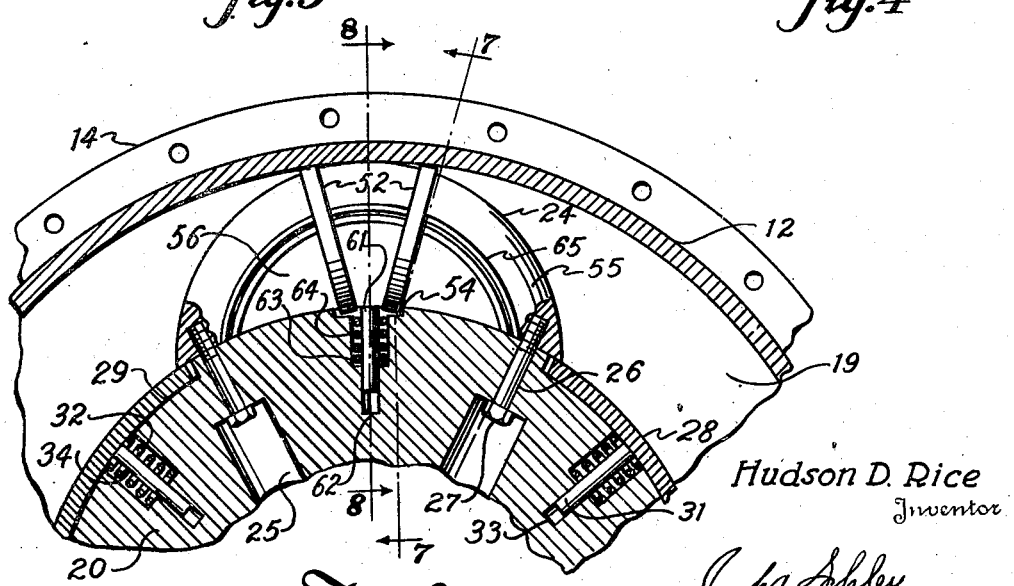

The invention will be more readily understood from a reading of the following specification and by reference to the accompanying drawings, wherein an example of the invention is shown, and wherein:

Figure 1 is an elevation of a rotary engine constructed in accordance with the invention, Figure 2 is a transverse, vertical, sectional view of the engine, showing the internal construction thereof, Figure 3 is an enlarged, transverse, vertical, sectional view, taken on the line 3—3 of Fig. 1, showing one of the gate valves in its lowered or closed position, Figure 4 is a view, similar to Figure 3, showing the gate valve raised and one of the pistons therebeneath, Figure 5 is an enlarged, transverse, vertical, sectional view, taken on the line 5—5 of Figure 2, Figure 6 is an enlarged, sectional view, taken longitudinally of one of the pistons and showing said piston in elevation, Figure 7 is a transverse, vertical, sectional view taken on the line 7—7 of Figure 6, showing one of the circumferential piston rings in elevation, Figure 8 is a similar view, taken on the line 8—8 of Figure 6, showing the relationship of the piston segments and sealing members, Figure 9 is an enlarged, sectional view of the piston as shown in Figure 8, Figure 10 is an isometric view of the external segment of the piston, Figure 11 is an isometric view of a portion of one of the longitudinal sealing members.

Figure 12 is an elevation of a modified form of piston, showing the segments of the piston separated with the sealing members omitted, and Figure 13 is a transverse, vertical, sectional view of the modified piston.

In the drawings, the numeral 10 designates the circular housing or casing of a rotary engine which is mounted upon a suitable base 11 and which includes two sections or halves 12 and 13. An external, peripheral flange 14 is formed on the section 12 and abuts an annular flange 15, angular in cross-section, provided on the periphery of the section 13, whereby the flanges may be fastened together by suitable bolts 16 to connect the sections. As is clearly shown in Figure 1, the base 11 is suitably bolted to the flanges 14 and 15 and may be secured thereto by the bolts 16. A circular cavity or chamber 17 is formed within the interior of the housing or casing 10 at the central portion thereof by recessing the internal, adjacent faces of the abutting sections 12 and 13 (Figs. 3 and 4). Beyond the chamber 17, the abutting faces of the sections are recessed as shown at 18 to provide an annular slot between said sections. The slot 18 is of less width than and has its inner portion communicating with the chamber 17, while the outer portion thereof opens into an annular cylinder 19 which is located contiguous to the outer periphery of the housing. The cylinder 19 is preferably circular in cross-section and is disposed concentrically of the annular slot and the chamber.

A rotor 20 is mounted to rotate within the slot and chamber and preferably has an integral axial shaft 21 which is journaled in the walls of the housing. The ends of the rotor shaft 21 project outwardly beyond the walls of the housing with a cam element 22 keyed to one end thereof and a drive wheel or pulley 23 secured to its opposite end. The rotor 20 consists of a circular, flat disk or plate having substantially the same diameter as the annular slot 18, whereby its periphery is in close proximity to the inner periphery of the cylinder 19. It is preferable that the slot and rotor be of less width than the chamber 17 so that said rotor will be spaced a slight distance from the inner faces of the sections 12 and 13.

A pair of pistons 24, adapted to travel through the annular cylinder 19, are secured to the rotor 20 and are spaced equi-distantly apart about the periphery of said rotor as shown in Figure 2. Each piston is cylindrical, being substantially semi-circular in longitudinal cross-section and having its ends rounded or curved in transverse section. As is clearly shown in Figure 6, a radially-extending recess 25 is formed in the rotor internally of each piston in radial alinement with each end portion thereof and communicates with a reduced, radial bore 26, which bore receives a suitable bolt 27 adapted to be screw-threaded into said piston end portion to fasten said piston to the rotor.

For sealing off the cylinder 19, as well as the space between the rotor and the housing sections 12 and 13 and the space between said rotor and each piston 24, a pair of arcuate sealing elements or members 28, of metal or other suitable material, are interposed between the periphery of the rotor and said housing sections in between the pistons. Intermediate the pistons 24, the periphery of the rotor is recessed as shown at 29 so as to be spaced inwardly of and away from the cylinder and these recesses are of such length as to extend a slight distance beneath said pistons as shown in Figures 3, 5 and 6. Each sealing member 28 has a convex outer surface 30 and is disposed within one of the recesses 29 with its lower surface engaging or spaced a slight distance from the periphery of the rotor, whereby the members form a part or continuation of the cylinder wall and said rotor. Since the ends of the sealing members are confined beneath the end portions of the pistons 24 and said members are disposed within the annular slot 18 between the adjacent faces of the housing sections, it will be manifest that said members will be frictionally secured to the rotor. A plurality of elongate, radially-extending pins 31 are fastened to or made integral with the inner arcuate surface of each sealing member and extend through recesses 32 into reduced counterbores or sockets 33 formed in the rotor. For urging the sealing members outwardly, a coiled or helical spring 34 is confined within each recess 32 upon the pin 31, which extends therethrough, between the shoulder formed by the counterbore 33 and the inner surface of the sealing member. It is pointed out that a somewhat similar sealing member or element is disclosed in my co-pending application, Serial No. 453,172, filed August 1, 1942.

As is clearly shown in Figures 1 through 5, a plurality of slidable, spring-pressed valve elements or gate valves 35, preferably three in number and having semi-circular recesses 36 formed in their lower ends, are slidably mounted within suitable valve bodies 37 which are secured to the outer surface of the housing 10. Each valve element extends through a radial slot 38 formed in the housing and intersecting the cylinder 19. The cam element 22 has a pair of separate and distinct cam surfaces and a suitable operating rod 39 is disposed between one of the cam surfaces and an outwardly-projecting portion of each valve element 35 for moving the lower end of said valve element out of the cylinder 19 to permit the passage of one of the pistons 24 therebeneath. The bottom of the slot 38 is curved so as to be complementary to the curvature of the recess 36 of its valve element whereby said recess engages the curved slot or bottom when said valve element is in its lowermost position to prevent the leakage of pressure or fluid past the valve element. The ends of each piston 24, which are rounded or curved in transverse section, have a radius which is also complementary to the radius of the recess 36 of the valve element, whereby said valve element remains in contact with the entire upper surface of the piston as said piston moves therebeneath. As shown in Figures 1, 2 and 5, the cylinder includes an exhaust port 40, a pair of air intake ports 41 and a pair of air outlet ports 42 which communicate with an air storage tank 44 through suitable pipes 43. A fuel inlet port 45, having a spark plug 46 (Fig. 5) disposed adjacent thereto, also communicates with the cylinder 19 and with a fuel inlet pipe 47 which extends from the air storage tank 44. The pipe 47 preferably has a carburetor 48, a check valve 49 and an air control valve 50 mounted therein, the valves being actuated by a suitable operating rod 51 which engages one of the cam surfaces of the cam element 22. Since the foregoing construction and the operation thereof, form no part of the present invention, it is believed that further details are unnecessary and that the use of the invention will be clearly apparent to those skilled in the art.

As has been hereinbefore set forth, each piston 24 is preferably circular in transverse section or cylindrical and is semi-circular in longitudinal section, being rigidly secured to the periphery of the rotor 20 by the bolts 27. To assure a pressure-tight seal between the exterior of the piston and the cylinder wall, a pair of metallic, split piston rings 52 surround or extend diametrically or circumferentially around said piston. As shown in Figures 6 and 7, the piston rings 52 are spaced from each other and engage within suitable annular grooves 53 formed in the exterior of the piston. A recess 54 is formed in the rotor internally of the central portion of the piston for receiving portions of the rings and permitting the same to surround or circumscribe said piston. It is preferable to split the piston longitudinally along its arcuate axis to provide an external, arcuate segment or section 55 and an internal, semi-circular section or segment 56, both of which segments have the ring grooves 53 formed in the exterior thereof. As is clearly shown in Figures 8 to 10, the upper or outer surface of the external segment 55 is semi-circular in longitudinal section and arcuate in transverse section, while the lower surface or underside thereof has a substantially identical longitudinal contour and is substantially flat transversely. A depending rib 57 is secured to or made integral with the underside of the external segment and has a plurality of cylindrical recesses 58 formed in the opposite lateral surfaces thereof in horizontal, axial alinement, the recesses being connected by intermediate reduced bores 59. The bolts 27 are screw-threaded into this segment and said segment overlies the ends of the sealing members 28.

The internal segment 56, having its inner surface swung on the same arc as the periphery of the rotor, is substantially complementary to the segment 55 and is provided with a longitudinal, axial channel or groove 60 in its upper or outer surface for receiving the rib 57 of said external segment. The channel 60 is of greater depth and width than the rib, so that said rib is spaced from the surfaces of said channel, as will be hereinafter more fully explained. An elongated pin or short rod 61 depends from the inner arcuate surface of the internal segment 56 at its central portion and engages within a suitable socket 62 formed in the rotor. The external portion of the socket 62 is enlarged to provide a recess 63 which receives a coiled or helical spring 64 adapted to be confined upon the rod 61 between the internal segment and the shoulder formed between said socket and the recess. Thus, the internal segment is constantly urged outwardly toward the external segment by the pressure of the spring 64 and confined in position by being clamped between the rotor and external segment. It is noted that the recess 63 communicates directly with the recess 54 which accommodates portions of the piston rings 52, whereby the rod 61 and spring 63 are disposed between said ring portions.

An arcuate sealing member or element 65, having a convex outer surface 66, is interposed between the adjacent surfaces of the segments 55 and 56 on each side of the rib 57 and channel 60, whereby the elements form a part or continuation of the piston. As is clearly shown in Figures 9 and 11, each sealing element is preferably angular in cross-section and has outwardly flared or inclined, lateral or transverse surfaces 67. The surfaces of the segments 55 and 56 adjacent the flared surfaces 67 of the sealing element are beveled or tapered outwardly complementary thereto. Due to the greater width of the channel 60, the rib 57 is spaced from the side walls of said channel and there is no engagement between the segments. For urging the convex outer surface 56 of each sealing element outwardly into engagement with the cylinder wall, a plurality of pins 68 are fastened to or made integral with the inner flat surface of said sealing element and each pin extends through one of the recesses 58 into its communicating bore 59. A coiled or helical spring 69 is confined within each recess 58 upon the pin 68, which extends therethrough, between the bottom of said recess and the inner surface of the sealing element. It is pointed out that the piston rings 52 overlie the sealing elements 65 which have transverse or vertical recesses 70 for receiving the same, whereby said rings tend to prevent displacement of said elements from the piston. Since the only connection between the internal segment and the rotor is by means of the sliding engagement of the rod 61 with the socket 62, it is manifest that said segment is free to move outwardly toward the external segment and into engagement with the sealing elements 65. Thus, the pressure of the spring 64 will constantly urge the segment 56 outwardly away from the rotor so as to assist in maintaining the elements 65 in sealing engagement with the cylinder wall and the bevelled surfaces of the segment 55. Obviously, the coaction of this spring-pressure with the pressures of the smaller springs 69 not only urges into and holds the sealing elements in packing-off position but also compensates for wear of the contacting surfaces.

As shown in Figures 12 and 13, the pistons 24 may be constructed in a substantially different manner and may include external and internal segments or sections 71 and 72. The rod 61 may be made integral with or secured to the internal segment 72 and the spaced ring grooves 53 are formed in the exterior of both segments. The upper or external surface of the segment 72 is flat in transverse or lateral contour as shown at 73 and engages the complementary underside or lower surface 74 of the segment 71 throughout its length (Fig. 13), thereby eliminating the rib and channel of the first form of the invention. The recesses 58 and bores 59 are formed in the segment 71 above its lower surface 74 and receive the pins 68 and springs 69. Arcuate sealing elements or members 75, of less length than the elements 65, are disposed longitudinally of the segments 71 and externally of the recesses 58 in complementary grooves 76 which terminate at their intersection with the circumferential ring grooves 53, whereby the intermediate portion of the segments 71 has a smooth, arcuate or semi-circular contour. Although each sealing element 75 has a convex outer surface 77 and its inner surface or other surfaces may be of any desired contour, said inner surface has been shown as curved or semi-circular in cross-section. It is noted that both the sealing elements 65 and 75 may have similar cross-sectional contours or might be entirely different from that disclosed by merely altering the segments to conform to the desired shape. If desired, co-extensive oil grooves 80 may be formed in the outer surfaces of the sealing elements 65 and 75.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The combination with a rotary engine having a housing, a cylinder formed within the housing and a rotor rotatable in said housing, of a piston including, a piston member mounted on the periphery of the rotor and adapted to travel through the cylinder, means carried by the piston member and extending longitudinally thereof for sealing off between said piston member and cylinder, means mounted on the piston member and extending circumferentially thereof for sealing off between the cylinder and said piston member, the longitudinal sealing means being pressure-actuated so as to be urged into sealing engagement with the wall of the cylinder and having a portion underlying the circumferential sealing means so as to be maintained in position thereby.

2. The combination with a rotary engine having a housing, an annular cylinder formed within the housing and a rotor rotatable in said housing, of a piston including, a piston member mounted on the periphery of the rotor and adapted to travel through the cylinder, the piston member being substantially semi-circular in longitudinal section and having an arcuate groove formed in and extending longitudinally of its exterior, a sealing element disposed in the groove for sealing off between said piston member and the wall of said cylinder, means for urging into and maintaining the element in sealing position, and a sealing member disposed circumferentially of the piston member for also sealing off between said member and the cylinder and having a portion thereof overlying a portion of the sealing element so as to assist in maintaining said element in position.

3. The combination with a rotary engine having a housing, an annular cylinder formed within the housing and a rotor rotatable in said housing, of a piston including, a piston member mounted on the periphery of the rotor and adapted to travel through the cylinder, the piston member being substantially semi-circular in longitudinal section and having an arcuate groove formed in and extending longitudinally of its exterior, a sealing element disposed in the groove for sealing off between said piston member and the wall of said cylinder, means for urging into and maintaining the element in sealing position, means forming a part of the piston member and disposed intermediate of said member and rotor, whereby the member includes internal and external substantially arcuate segments, and pressure means for urging the internal segment toward the external segment.

4. The combination set forth in claim 3 wherein the means for urging the sealing element into sealing position is resilient and disposed within the external segment of the piston member.

5. The combination set forth in claim 3 including, a sealing ring disposed circumferentially of the piston member and of its segments for sealing off between said piston member and the cylinder, the ring having a portion thereof overlying a portion of the sealing element so as to confine the same upon said piston member.

6. The combination with a rotary engine having a housing, an annular cylinder formed within the housing and a rotor rotatable in said housing, of a piston including, a piston member mounted on the periphery of the rotor and adapted to travel through the cylinder, the piston member being substantially semi-circular in longitudinal section and having an arcuate groove formed in and extending longitudinally of its exterior, a sealing element disposed in the groove for sealing off between said piston member and the wall of said cylinder, and means for urging into and maintaining the element in sealing position, the piston member including a pair of substantially arcuate internal and external segments, the arcuated groove and sealing element being disposed intermediate of the segments so as to seal off therebetween, the internal segment having pressure means for urging the same into engagement with said sealing element so as to increase the sealing action thereof and compensate for wear.

7. The combination with a rotary engine having a housing, an annular cylinder formed within the housing and a rotor rotatable in said housing, of a piston including, a piston member mounted on the periphery of the rotor and adapted to travel through the cylinder, the piston member being substantially semi-circular in longitudinal section and having an arcuate groove formed in and extending longitudinally of its exterior, and a sealing element disposed in the groove for sealing off between said piston member and the wall of said cylinder, means for urging into and maintaining the element in sealing position, the piston member including a pair of substantially arcuate internal and external segments, the external segment having the arcuate groove formed therein, the internal segment having pressure means for urging the same into engagement with said external segment.

8. The combination with a rotary engine having a housing, a cylinder formed within the housing and a rotor rotatable in said housing, of a piston including, a piston member mounted on the periphery of the rotor and adapted to travel through the cylinder, the piston member including internal and external substantially arcuate segments, and pressure means for urging the internal segment toward the external segment.

HUDSON D. RICE.